(12) United States Patent
Matsuo et al.

(10) Patent No.: US 8,504,748 B2
(45) Date of Patent: Aug. 6, 2013

(54) COMMUNICATION SLAVE AND COMMUNICATION NETWORK SYSTEM

(75) Inventors: Kazushi Matsuo, Chiryu (JP); Hideaki Ishihara, Okazaki (JP); Toshihiko Matsuoka, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 256 days.

(21) Appl. No.: 12/969,641

(22) Filed: Dec. 16, 2010

(65) Prior Publication Data
US 2011/0185093 A1 Jul. 28, 2011

(30) Foreign Application Priority Data

Jan. 26, 2010 (JP) .................................. 2010-014179

(51) Int. Cl.
*G06F 13/00* (2006.01)

(52) U.S. Cl.
USPC ......................................................... 710/110

(58) Field of Classification Search
USPC ..................................................... 710/1, 110
See application file for complete search history.

(56) References Cited

U.S. PATENT DOCUMENTS

| | | | | |
|---|---|---|---|---|
| 6,397,280 B1 * | 5/2002 | Nitschke et al. | ............... | 710/110 |
| 6,745,270 B1 * | 6/2004 | Barenys et al. | ............... | 710/104 |
| 7,259,589 B1 * | 8/2007 | Hui et al. | ........................ | 326/63 |
| 7,523,239 B2 * | 4/2009 | Shimizu | ......................... | 710/110 |
| 7,966,438 B2 * | 6/2011 | Punyko et al. | ................. | 710/110 |
| 8,171,193 B2 * | 5/2012 | Yamada | ......................... | 710/105 |
| 8,190,800 B2 * | 5/2012 | Tanaka et al. | ................. | 710/104 |
| 8,195,857 B2 * | 6/2012 | Barrenscheen | ............... | 710/110 |
| 2003/0034883 A1 | 2/2003 | Sato et al. | | |
| 2006/0224776 A1 * | 10/2006 | Vanderhenst | ..................... | 710/1 |
| 2008/0277471 A1 * | 11/2008 | Mashiko | .................. | 235/462.01 |
| 2009/0121776 A1 | 5/2009 | Nagase | | |
| 2011/0185093 A1 * | 7/2011 | Matsuo et al. | ................. | 710/110 |

FOREIGN PATENT DOCUMENTS

JP 2009-239429 A 10/2009

OTHER PUBLICATIONS

Office Action dated Mar. 7, 2013 in corresponding CN Patent Application No. 201110006337.X (and English translation).

* cited by examiner

*Primary Examiner* — Paul R Myers
*Assistant Examiner* — Christopher A Daley
(74) *Attorney, Agent, or Firm* — Posz Law Group, PLC

(57) ABSTRACT

In a communication network system in which a master and a plurality of communication slaves are coupled through a high-potential side bus and a low-potential side bus in a daisy-chain manner, each of the communication slaves includes a control circuit, a resistance element, and a potential difference detecting portion. The control circuit controls communication with the master. The resistance element is inserted into the high-potential side bus at a portion located downstream of a point where the control circuit is coupled with the high-potential side bus. The potential difference detecting portion detects a potential difference between an upstream terminal of the resistance element and the low-potential side bus. The control circuit sets an ID value for communicating with the master in accordance with the potential difference detected by the potential difference detecting portion.

2 Claims, 13 Drawing Sheets

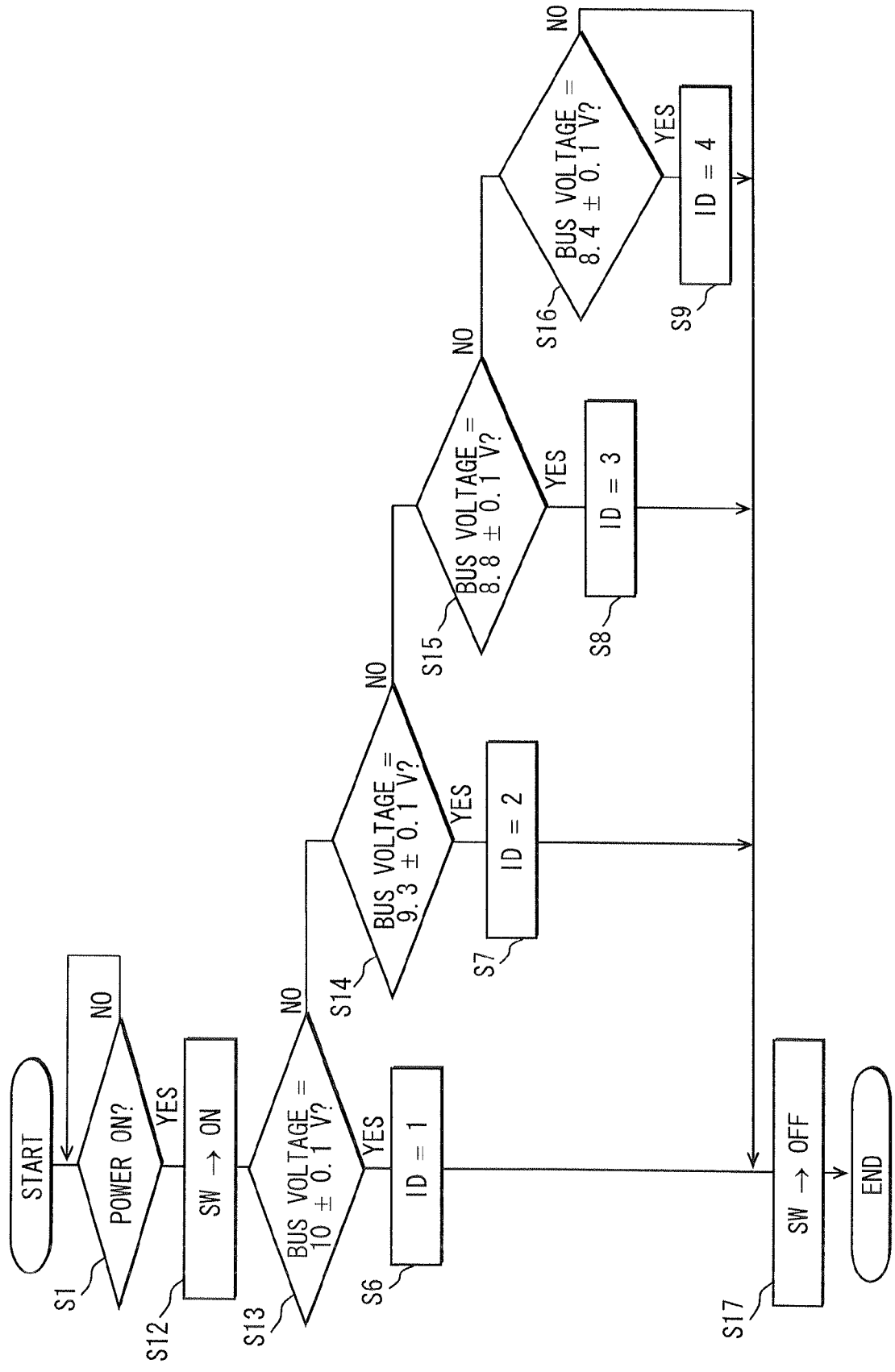

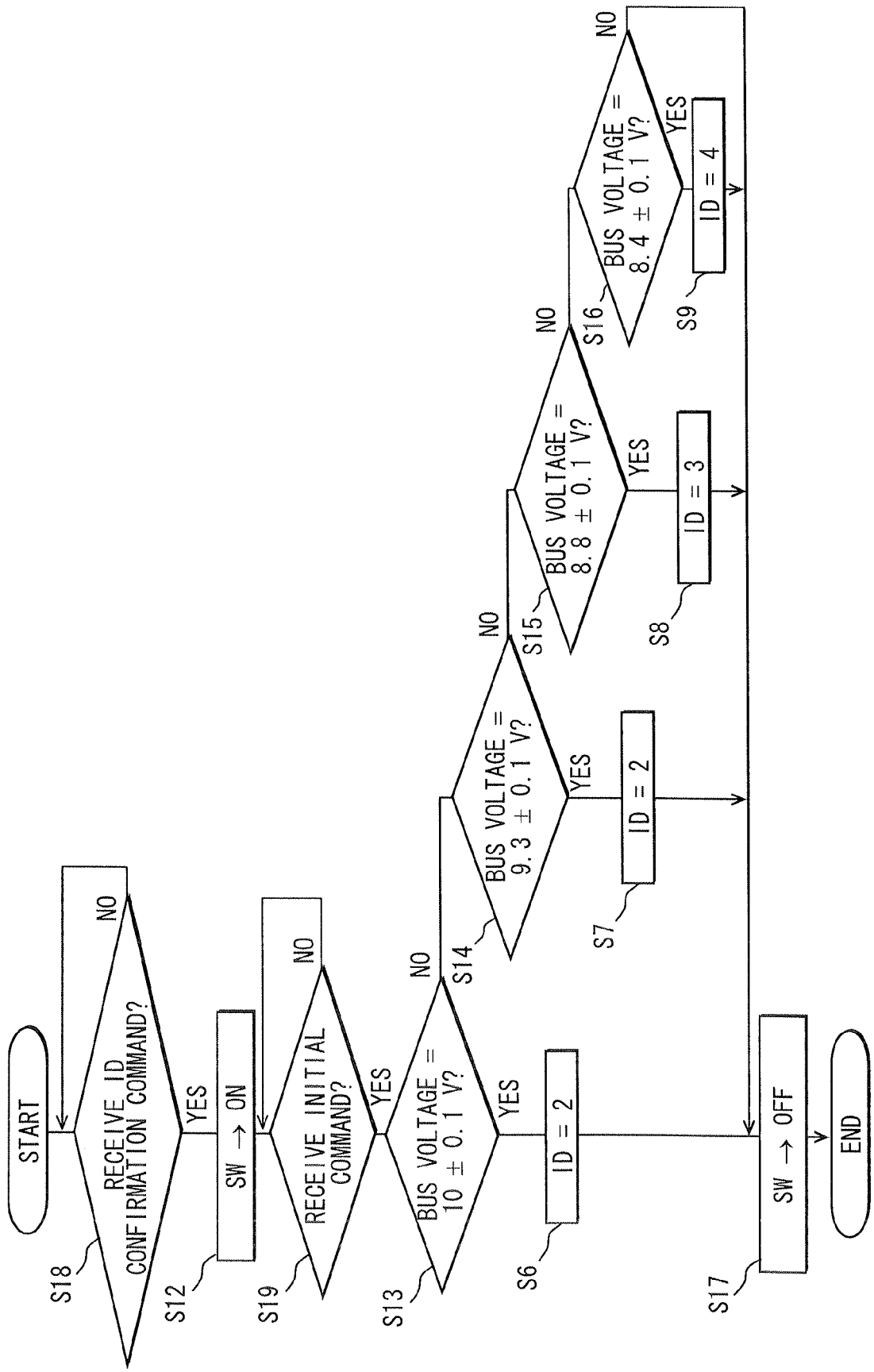

COMMUNICATION SLAVE AND COMMUNICATION NETWORK SYSTEM

CROSS REFERENCE TO RELATED APPLICATIONS

The present application is based on and claims priority to Japanese Patent Application No. 2010-14179 filed on Jan. 26, 2010, the contents of which are incorporated in their entirety herein by reference.

BACKGROUND OF THE INVENTION

1. Field of the Invention

The present invention relates to a communication slave used in a communication network system configured by coupling a master and a plurality of communication slaves through a pair of buses in a daisy-chain manner. The present invention also relates to the communication network system.

2. Description of the Related Art

A protocol of a communication network including a master and a plurality of slaves coupled through a pair of buses in a daisy-chain manner includes a DSI (distributed system interface) and a SbW (safe by wire). The communication network needs to set an ID to each of the slaves so that the master can perform a serial communication with the slaves. For example, JP-A-2003-152741 (corresponding to US 2003/0034883 A1) discloses a communication apparatus in which each of plurality of slave devices inserts a switch into a power source line that forms a bus a master device sets IDs of the slaves through the bus in order from the slave device close to the master device based on a connection order of the slaves and IDs stored in the master device, and the slave device whose ID is set turns on the switch one by one so that a next slave is coupled with the bus.

When the switch is inserted into the bus, an element such as a transistor for forming the switch needs to reduce an on-resistance value. Accordingly, a dimension of the switch may be increased, and a dimension of each of the slave, eventually, a dimension of the whole communication network system may be increased.

SUMMARY OF THE INVENTION

In view of the foregoing problems, it is an object of the present invention to provide a communication slave and a communication network system that can appropriately set an ID without inserting a switch in to a bus.

According to an aspect of the present invention, a communication slave used in a communication network system in which a master and a plurality of the communication slaves are coupled through a high-potential side bus and a low-potential side bus in a daisy-chain manner is provided. The communication slave includes a control circuit, a resistance element, and a potential difference detecting portion. The control circuit controls communication with the master. The resistance element is inserted into the high-potential side bus at a portion located downstream of a point where the control circuit is coupled with the high-potential side bus. The potential difference detecting portion detects a potential difference between an upstream terminal of the resistance element and the low-potential side bus. The control circuit sets an ID value for communicating with the master in accordance with the potential difference detected by the potential difference detecting portion.

The control circuit in the communication slave consumes a certain amount of electric current when the control circuit operates. Thus, the potential difference between the high-potential side bus and the low-potential side bus detected at each of the communication slaves decreases from an upstream side close to the master to a downstream side far from the master. Because the control circuit sets the ID value in accordance with the potential difference, the control circuit can set a unique ID value without inserting a switch having a low on-resistance to the bus.

According to another aspect of the present invention, a communication network system includes a master, a plurality of slaves, and a high-potential side bus and a low-potential side bus coupling the master and the plurality of slaves in a daisy-chain manner. Each of the plurality of slaves includes a control circuit, a resistance element, a potential difference detecting portion, and a driver. The control circuit controls communication with the master. The resistance element is inserted into the high-potential side bus at a portion located downstream of a point where the control circuit is coupled with the high-potential side bus. The potential difference detecting portion detects a potential difference between an upstream terminal and a downstream terminal of the resistance element and outputs potential difference data based on the detected potential difference. The driver is coupled between the upstream terminal of the resistance element and the low-potential side bus. The driver transmits a signal to the master by changing a state of electric current flowing to the high-potential side bus and the low-potential side bus. When the control circuit receives a trigger signal from the master, the control circuit turns on the driver so that electric current flows to the high-potential side bus and the low-potential side bus. The control circuit receives the potential difference data output from the potential difference detecting portion while the electric current flows, and then the control circuit turns off the driver. When the control circuit receives a trigger signal from the master next time, the control circuit transmits an ID setting data that is determined based on the potential difference data to the master while avoiding a collision with a transmitting process by other slave in the plurality of slaves. When the master receives the ID setting data from all the plurality of slaves, the master decides ID data of each of the plurality of slaves based on the ID setting data, and the master transmits the ID data with an ID setting command to each of the plurality of slaves in order. When the ID data transmitted from the master corresponds to the potential difference data, the control circuit sets the ID data as an ID value.

In the above-described communication network system the master sets the ID of each of the slaves after figuring out the IDs of all the slaves. Thus, a discrepancy in the setting ID between the master and the slaves can be restricted.

BRIEF DESCRIPTION OF THE DRAWINGS

Additional objects and advantages of the present invention will be more readily apparent from the following detailed description of preferred embodiments when taken together with the accompanying drawings. In the drawings:

FIG. 6 is a flowchart showing an ID setting process performed by slaves in the communication network system according to the third embodiment;

FIG. 7 is a flowchart showing an ID setting process performed by slaves in a communication network system according to a fourth embodiment of the present invention;

DETAILED DESCRIPTION OF THE PREFERRED EMBODIMENTS

First Embodiment

Figure 1:
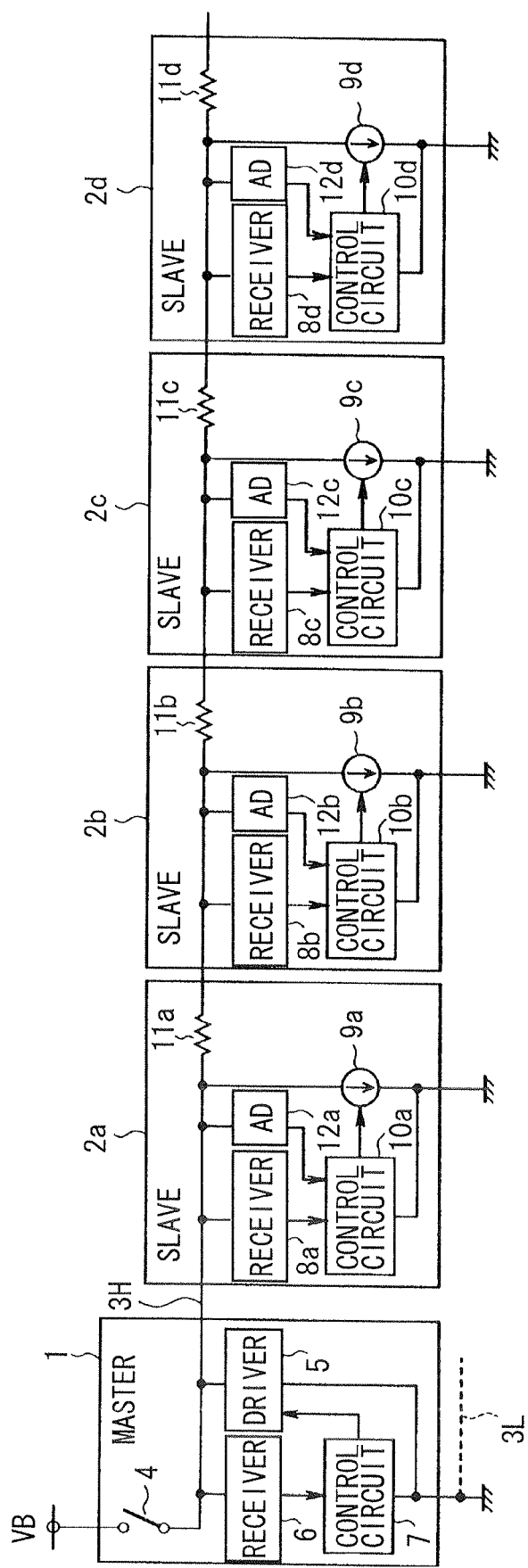
FIG. 1 is a diagram showing a communication network system according to a first embodiment of the present invention.
Figure 2:
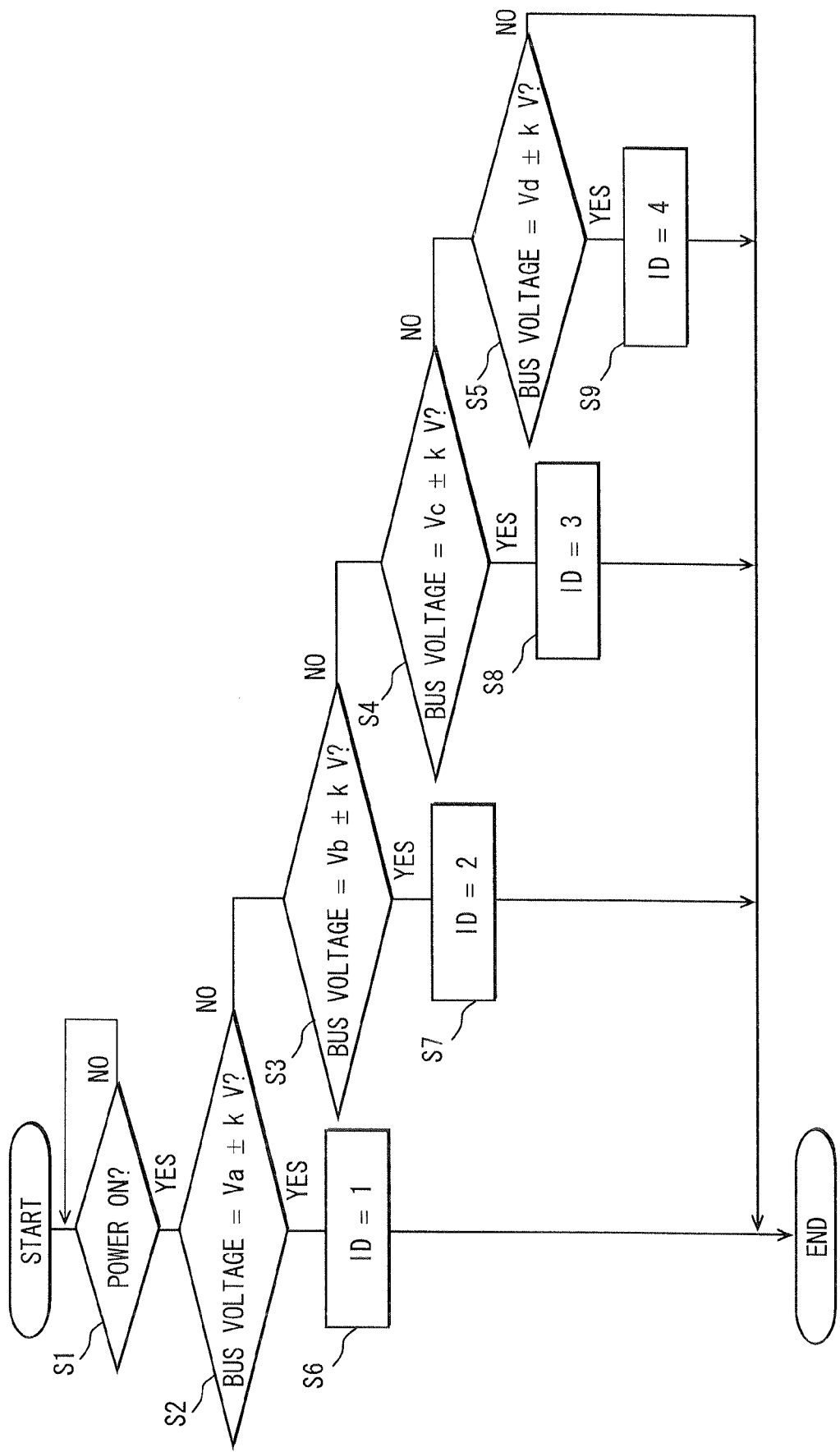
FIG. 2 is a flowchart showing an ID setting process performed by slaves in the communication network system according to the first embodiment.

A communication network system according to a first embodiment of the present invention will be described with reference to FIG. 1 and FIG. 2. The communication network system includes a master 1, slaves 2a-2d, a communication bus 3H and a communication bus 3L. Each of the slaves 2a-2d can operate as a communication slave. The communication bus 3H can operate as a high-potential side bus. The communication bus 3L can operate as a low-potential side bus. The slaves 2a-2d are coupled with the master 1 through the communication buses 3H and 3L in a daisy-chain manner. The slaves 2a-2d are coupled in this order from an upstream side close to the master 1 to a downstream side far from the master 1. The master 1 includes a switch 4. The communication bus 3H is applied with power source voltage VB through the switch 4. The communication bus 3L is applied with the ground potential. Regarding the communication bus 3L, only a part is shown by dashed line, and the other part is not shown in FIG. 1.

The master 1 further includes a driver 5, a receiver 6, and a control circuit 7. The driver 5 transmits a signal to the slaves 2a-2d through the communication buses 3H and 3L. The receiver 6 receives a response signal from the slaves 2a-2d through the communication buses 3H and 3L. The control circuit 7 controls the switch 4, the driver 5, and the receiver 6. The control circuit 7 includes a microcomputer. The control circuit 7 controls the driver 5 so as to change a potential difference between the communication buses 3H and 3L and thereby transmitting the signal from the master 1. The response signal received with the receiver 6 is input to the control circuit 7.

The slaves 2a-2d respectively include receivers 8a-8d, drivers 9a-9d, control circuits 10a-10d, shunt resistors 11a-11d, and A/D converter circuits (AD) 12a-12d. Each of the shunt resistors 11a-11d can operate as a resistance element. Each of the A/D converter circuits 12a-12 can operate as a potential difference detecting portion. Because the slaves 2a-2d have configurations similar to each other, the configuration of the slave 2a will be described on behalf of the slaves 2a-2d. The receiver 8a receives the signal transmitted from the master 1. The driver 9a transmits the response signal to the master 1. The control circuit 10a controls the receiver 8a and the driver 9a. The control circuit 10a includes a microcomputer. The driver 9a includes a current source coupled between the communication buses 3H and 3L. The driver 9a is coupled with the communication bus 3H at a point located downstream of a point where the A/D converter circuit 12a is coupled with the communication bus 3H. The control circuit 10a controls an on-off state of the current source so as to change electric current flowing to the communication buses 3H and 3L and thereby transmitting the response signal to the master 1. In other words, the control circuit 10a controls communication with the master 1.

In the communication bus 3H passing through the slave 2a, the shunt resistor 11a is inserted between a point where the driver 9a is coupled with the communication bus 3H and the slave 2b. In addition, the shunt resistor 11a is inserted into the communication bus 3H at a portion located downstream of a point where the control circuit 10a is coupled with the communication bus 3H. The shunt resistor 11a has a resistance of, for example, from a few Ω to about 10Ω. In order to keep impedance balance of the communication buses 3H and 3L, a shunt resistor (not shown) having the same resistance is also inserted into the communication bus 3L.

The A/D converter circuit 12a is coupled with the communication bus 3H at a point located between a point where the receiver 8a is coupled and the point where the driver 9a is coupled. The A/D converter circuit 12a can operate as a potential difference detecting portion. The A/D converter circuit 12a converts the potential between the communication buses 3H and 3L from analog to digital, and outputs digital data to the control circuit 10a. Each of the slaves 2a-2d is activated by being supplied with electric power through the communication buses 3H and 3L. For example, as DSI, a power supply phase and a communication phase can be switched alternately.

An ID setting process of the communication network, system according to the present embodiment will be described with reference to FIG. 2. When the power source voltage VB is applied to the communication bus 3H, each of the slaves 2a-2d sets ID values through a process shown in FIG. 2. When the master 1 turns on the switch 4 and the power source voltage VB is applied to the communication bus 3H, which corresponds to "YES" at S1, each of the slaves 2a-2d detects the voltage change through a corresponding one of the receivers 8a-8d. In addition, each of the A/D converter circuits 12a-12d detects the potential difference between the communication buses 3H and 3L and converts analog data of the potential difference into digital data. The digital data of the potential difference is referred to as a bus voltage. At S2 to S9, each of the slaves 2a-2d sets the ID values in accordance with the bus voltage.

In each of the slaves 2a-2d, electric current is consumed by a circuit including a corresponding one of the control circuits 10a-10d. Thus, a voltage drop occurs at the shunt resistors 11a-11d in the slaves 2a-2d located on an upstream side. Thus, the bus voltages detected by the A/D converter circuits 12a-12d decrease from the upstream side to the downstream side. The bus voltage detected by the A/D converter circuits 12a-12d depend on the power source voltage VB, resistance values of the shunt resistors 11a-11d lengths and impedances of the communication buses 3H and 3L.

In the present embodiment, threshold values Va-Vd having a relationship of VB>Va>Vb>Vc>Vd are set. In addition, an allowable measured value "k" is set. For example, the allowable measured value "k" is about 0.1 V. When the bus voltage=Va±k V, which corresponds to "YES" at S2, the ID value is set to 1 at S6. When the bus voltage=Vb±k V, which corresponds to "YES" at S3, the ID value is set to 2 at S7. When the bus voltage=Vc±k V, which corresponds to "YES" at S4, the ID value is set to 3 at S8. When the bus voltage=Vd±k V, which corresponds to "YES" at S4, the ID value is set to 4 at S9. In the present case, the slave 2a is set to have the ID value of 1, the slave 2b is set to have the ID value of 2, the slave 2c is set to have the ID value of 3, and the slave 2d is set to have the ID value of 4 in order.

As described above, in the communication bus 3H passing through the slaves 2a-2d, each of the shunt resistors 11a-11d is inserted into the portion downstream of the point where a corresponding one of the control circuits 10a-10d is coupled with the communication bus 3H. Each of the control circuits 10a-10d sets the ID value for communicating with the master 1 in accordance with the potential difference between the communication buses 3H and 3L detected by a corresponding one of the A/D converter circuits 12a-12d. Each of the shunt resistors 11a-11d can have a dimension smaller than a transistor having an on-resistance of the same degree. For example, a transistor having an on-resistance of 5Ω has a dimension of about 0.265 mm² and a shunt resistor having a resistance of 5Ω has a dimension of about 0.0146 mm². Thus, a necessary area is about twentieth.

The control circuits 10a-10d consume a certain amount of electric current when the control circuits 10a-10d operate. Because the potential difference between the communication buses 3H and 3L detected at each of the slaves 2a-2d decreases from the upstream side to the downstream side, each of the slaves 2a-2d can set a unique ID value. Therefore, it is not necessary to insert a switch (transistor) having a low on-resistance in the communication buses 3H and 3L, dimensions of the slaves 2a-2d and, eventually, a dimension of the communication network system can be reduced. The control circuits 10a-10d sets the ID values when the power source voltage VB is applied through the communication bus 3H. Thus, in an initial state, the slaves 2a-2d can autonomously set the ID values even when the slaves 2a-2d do not receive a control command from the master 1. Because the control circuits 10a-10d set the ID values in ascending order in accordance with decrease in the detected bus voltage, the slaves 2a-2d further away from the master 1 can have larger ID values.

Second Embodiment

Figure 3:
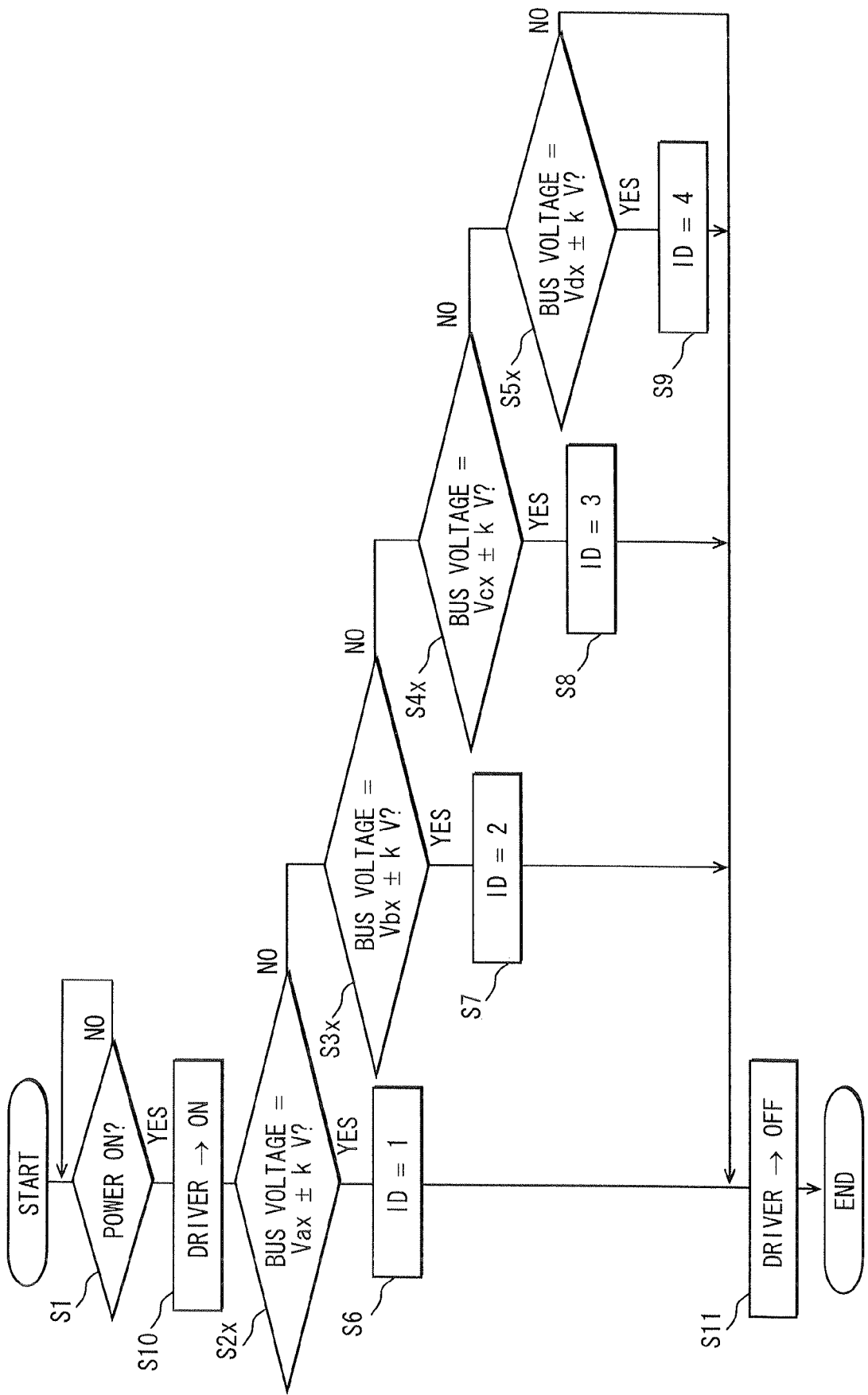
FIG. 3 is a flowchart showing an ID setting process performed by slaves in a communication network system according to a second embodiment of the present invention.

An ID setting process of a communication network system according to a second embodiment of the present invention will be described with reference to FIG. 3. When each of the control circuits 10a-10d in the slaves 2a-2d determines that the power source voltage VB is applied to the communication bus 3H, which corresponds to "YES" at S1, each of the control circuits 10a-10d turns on a corresponding one of the drivers 9a-9d at S10. Each of the drivers 9a-9d can operate as a current consuming circuit. In other words, each of the control circuits 10a-10d activates the current source so that a constant current flows and electric current is consumed. At S2x to S5x, each of the control circuits 10a-10d compares the bus voltage with threshold values Vax-Vdx instead of the threshold values Va-Vd and sets an ID value at S6 to S9 in a manner similar to the first embodiment. After setting the ID value, each of the control circuits 10a-10d turns off a corresponding one of the drivers 9a-9d at S11, and the ID setting process ends.

In the present embodiment, each of the control circuits 10a-10d activates the corresponding one of the drivers 9a-9d when each of the control circuits 10a-10d set the ID value. Thus, even when a consumption current of the control circuits 10a-10d is low, the bus voltage detected at the slaves 2a-2d can differ from each other, and the resistance value of each of the shunt resistors 11a-11d inserted into the communication buses 3H and 3L can be reduced. Furthermore, because a current consumption state is changed with the drivers 9a-9d provided in the slaves 2a-2d for responding to the master 1, additional current consumption current is not required.

Third Embodiment

Figure 4:
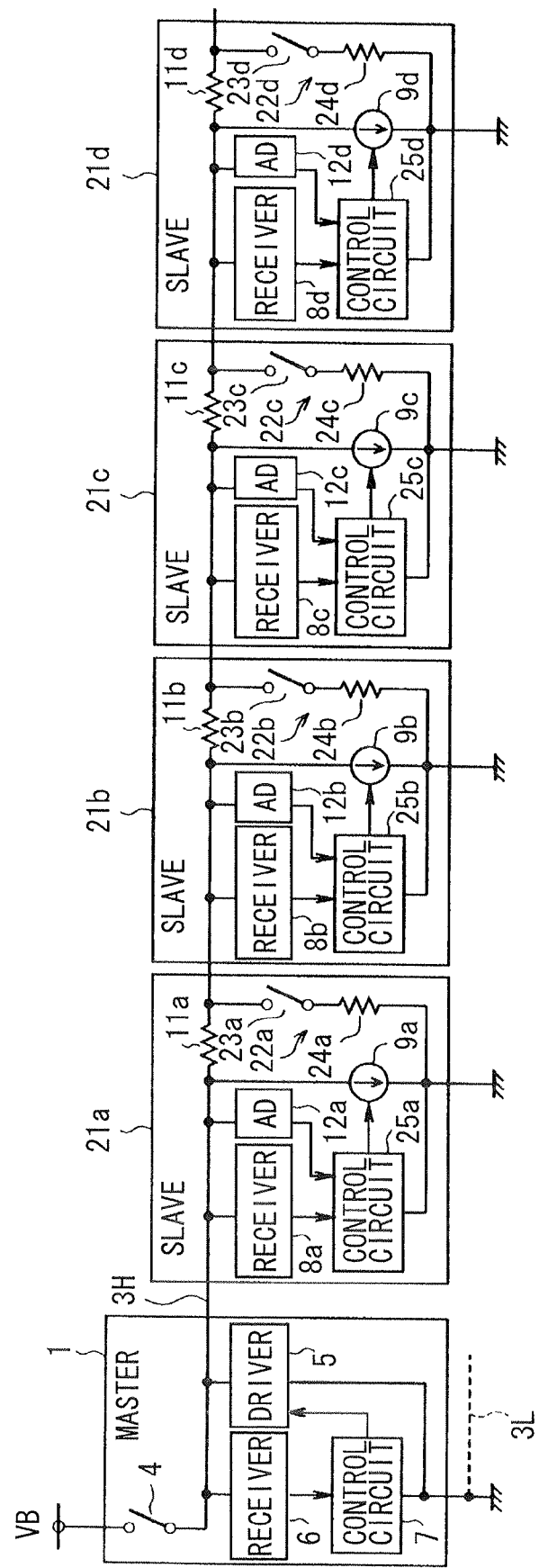
FIG. 4 is a diagram showing a communication network system according to a third embodiment of the present invention.

A communication network system according to a third embodiment of the present invention will be described with reference to FIG. 4 to FIG. 6. The communication network system according to the present embodiment includes the master 1 and a plurality of slaves 21a-21d. Each of the slaves 21a-21d can operate as a communication slave. The slaves 21a-21d are respectively configured by adding current consuming circuits 22a-22d to the slaves 2a-2d in the first embodiment. The current consuming circuits 22a-22d respectively include switches 23a-23d and load resistors 24a-24d coupled in series. Each of the load resistors 24a-24d can operate as a resistance element. The current consuming circuits 22a-22d are respectively coupled between downstream terminals of the shunt resistors 11a-11d and the ground. Each of the switches 23a-23d is normally open. Each of the switches 23a-23d may be formed of, for example, a transistor. Each of the switches 23a-23d is turned on and off by a corresponding one of control circuits 25a-25d. When each of the switches 23a-23d is turned on, the corresponding one of the load resistors 24a-24d is coupled between the communication buses 3H and 3L.

Figure 5A:
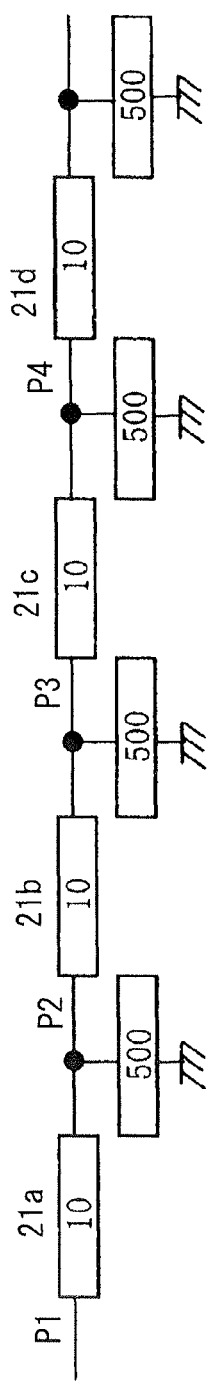
FIG. 5A to FIG. 5G are diagrams showing examples of bus voltages detected at slaves in the communication network system according to the third embodiment.
Figure 5B:
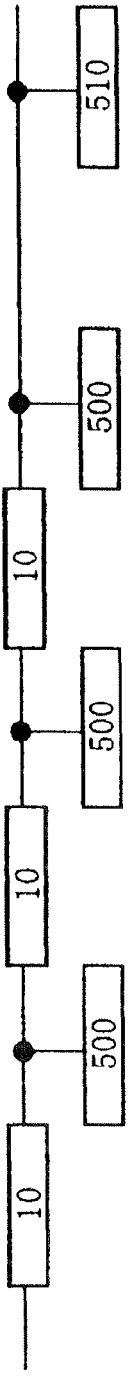
Figure 5C:
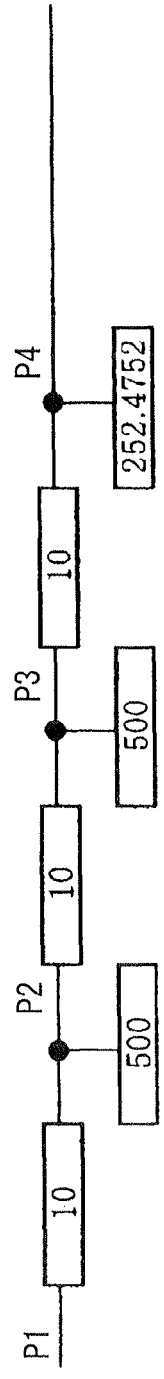
Figure 5D:
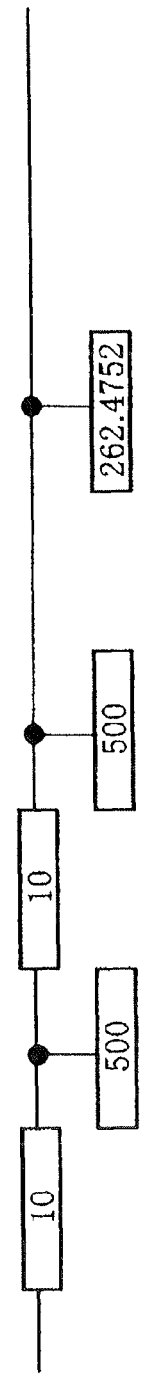
Figure 5E:
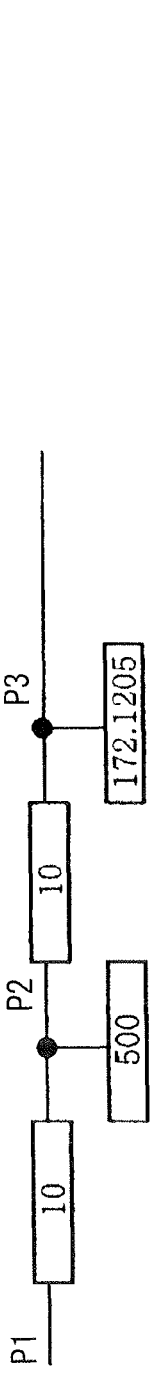
Figure 5F:
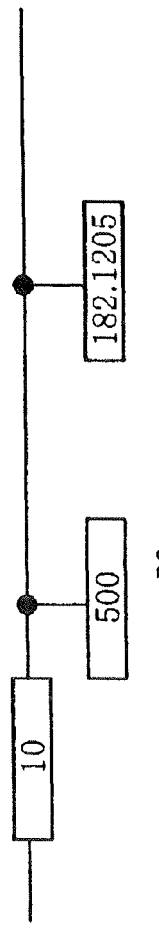
Figure 5G:
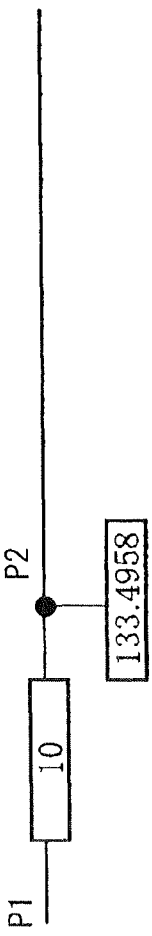
Figure 8:
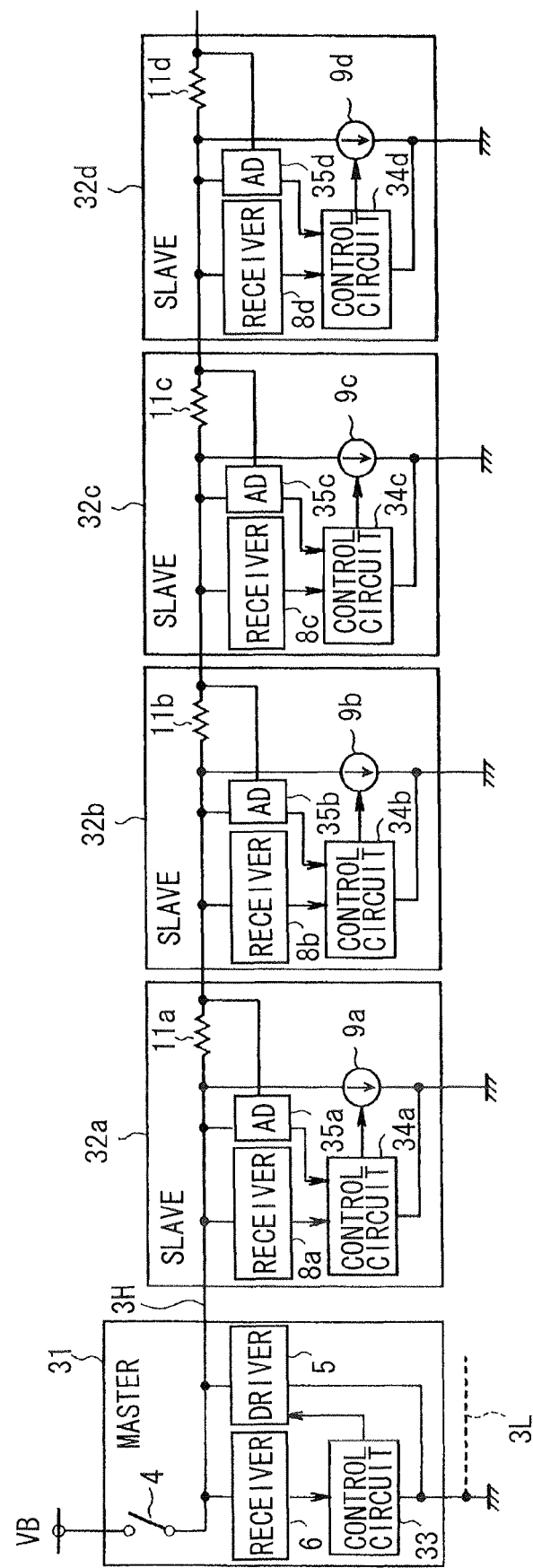
FIG. 8 is a diagram showing a communication network system according to a fifth embodiment of the present invention.

In an example shown in FIG. 5A-FIG. 5G, the power source voltage VB is 10Ω, the resistance value of each of the shunt resistors 11a-11d is 10Ω, the resistance value of each of the load resistors 24a-24d is 500Ω. When each of the switches 23a-23d in the slaves 21a-21d is turned on, each of the A/D converter circuits 12a-12d in the slaves 21a-21d detects the bus voltage as shown in FIG. 5A-FIG. 5G. When combined resistance values are detected from the downstream side, the combined resistance value at the slave 21d is a parallel value of 510Ω and 500Ω, that is, 252.4752Ω as shown in FIG. 5C. The combined resistance value at the slave 21c is a parallel value of 262.4752Ω and 500Ω, that is, 172.1205Ω as shown in FIG. 5E. The combined resistance value at the slave 21b is a parallel value of 182.1205Ω and 500Ω, that is, 133.4958Ω as shown in FIG. 5G.

The bus voltage detected at a point P1 in the slave 21a is 10 V, and an electric current that flows at the point P1 is 154.2682 mA. The bus voltage detected at a point P2 in the slave 21b is $$10 \times 133.4958/(10+133.4958) \approx 9.3031 \text{ V, and}$$

an electric current that flows at the point P2 is $$9.3031/133.4958 \approx 69.6884 \text{ mA.}$$

When calculated in the same manner, the bus voltage detected at a point P3 in the slave 21c is 8.7923 V and an electric current that flows at the point P3 is 51.0822 mA, the bus voltage detected at a point P4 in the slave 21d is 8.4573 V and an electric current that flows at the point P4 is 33.4976 mA.

An ID setting process according to the present embodiment will be described with reference to FIG. 6. When each of the control circuits 25a-25d determines that the power source voltage VB is applied to the communication bus 3H, which corresponds "YES" at S2, each of the control circuits 25a-25d turns on the corresponding one of the switches 23a-23d in the current consuming circuits 22a-22d at S12 so that the corresponding one of the load resistors 24a-24d is coupled between the communication buses 3H and 3L. At S13 to S16, the threshold values Va-Vd are set to specific values based on the bus voltages shown in FIG. 5.

When the bus voltage=10±0.1 V, which corresponds to "YES" at S13, the ID value is set to 1 at S6. When the bus voltage=9.3±0.1 V, which corresponds to "YES" at S14, the ID value is set to 2 at S7. When the bus voltage=8.8±0.1 V which corresponds to "YES" at S15, the ID value is set to 3 at S8. When the bus voltage=8.4±0.1 V, which corresponds to "YES" at S16, the ID value is set to 4 at S9. In the present case, the slave 21a is set to have the ID value of 1, the slave 21b is set to have the ID value of 2, the slave 2c is set to have the ID value of 3, and the slave 2d is set to have the ID value of 4 in order. After setting the ID values, each of the control circuits 25a-25d turns off the corresponding one of the switches 23a-23d at S17. As described above, in the present embodiment, the current consuming circuits 22 respectively include the switches 23a-23d and the load resistors 24a-24d coupled in series. Thus, by turning on the switches 23a-23d, electric current flows in the load resistors 24a-24d, and a current consumption state can be changed.

Fourth Embodiment

An ID setting process according to a fourth embodiment of the present invention will be described with reference to FIG. 7. A configuration of the communication network system according to the present embodiment is similar to a configuration of the communication network system according to the third embodiment. The ID setting process shown in FIG. 7 is executed after the ID setting process shown in FIG. 6 is executed and the ID values of the slaves 21a-21d are set. When each of the slaves 21a-21d receives an ID confirmation command from the master 1, which corresponds to "YES" at S18, each of the switches 23a-23d in the current consuming circuits 22a-22d is turned on at S12.

When each of the slaves 21a-21d receives an initial command from the master 1, which corresponds to "YES" at S19, each of the control circuits 25a-25d in the slaves 21a-21d executes the subsequent processes in a manner similar to the third embodiment. In the present embodiment, each of the control circuits 25a-25d sets the ID value when each of the slaves 21a-21d receives the ID confirmation command and the initial command from the master 1. Thus, each of the slaves 21a-21d can set the ID value at any time when the master 1 transmits the commands.

Fifth Embodiment

A communication network system according to a fifth embodiment of the present invention will be described with reference to FIG. 8 to FIG. 11B. The communication network system according to the present embodiment includes a master 31 and a plurality of slaves 32a-32d coupled with the master 31 in a daisy-chain manner. The master 31 includes a control circuit 33 instead of the control circuit 7. The slaves 32a-32d respectively include control circuits 34a-34d instead of the control circuits 10a-10d and A/D converter circuits 35a-35d (potential difference detecting portion) instead of the A/D converter circuits 12a-12d. Each of the A/D converter circuits 35a-35d can operate as a potential difference detecting portion. Each of the A/D converter circuits 35a-35d detects potentials of an upstream terminal and a downstream terminal of corresponding one of the shunt resistors 11a-11d so as to detect a potential difference between the upstream terminal and the downstream terminal. The process for detecting the potential difference between the upstream terminal and the downstream terminal may also be performed by, the control circuits 34a-34d.

A slave voltage receiving process performed by the master 1 will be described with reference to FIG. 9A. At S21, the control circuit 33 in the master 1 changes the voltage level of the communication bus 3H and transmits a trigger signal. At S22, the master 1 transmits a synchronizing signal that is used by the slaves 32a-32d for transmitting data. When the master 1 receive the data from the slaves 32a-32, which corresponds to "YES" at S23, the master 1 stores the data, for example, in a memory at S24. The master repeats the processes at S22 to S24 until the master 1 stops receiving the data from the slaves 32a-32d, which corresponds "NO" at S23.

The synchronizing signal transmitted from the master 31 is, for example, a series of data values of 0. Each of the slaves 32a-32d transmits the data bit by bit in synchronization with, for example, a falling edge of the voltage signal having the data value of 0. When the master 1 stops receiving the data from the slaves 32a-32d, which corresponds to "NO" at S25, the master 1 sorts the stored data at S25 and assigns ID data to each of the slaves 32a-32d at S26.

Figure 9A:
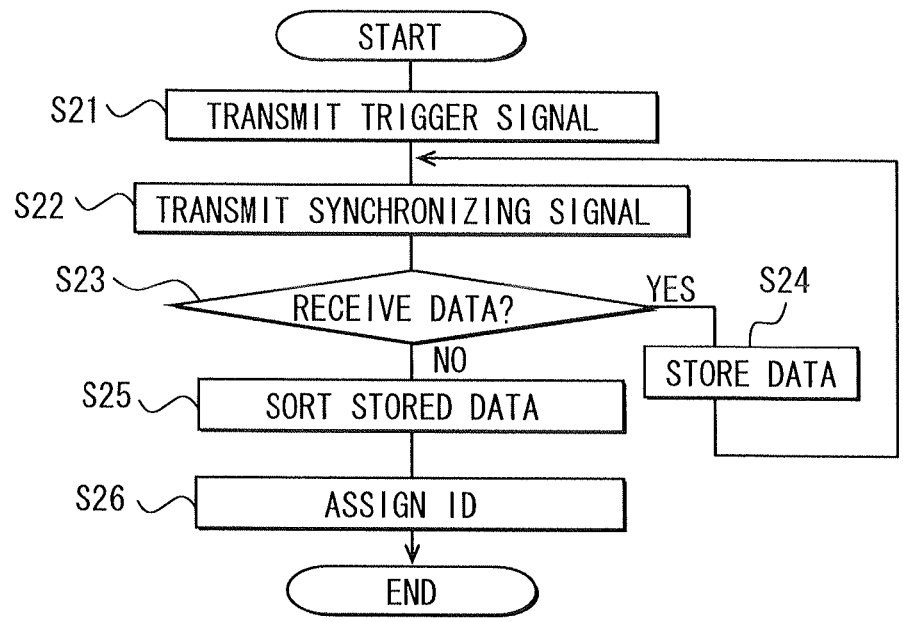
FIG. 9A is a flowchart showing a slave voltage detecting process performed by a master.
Figure 9B:
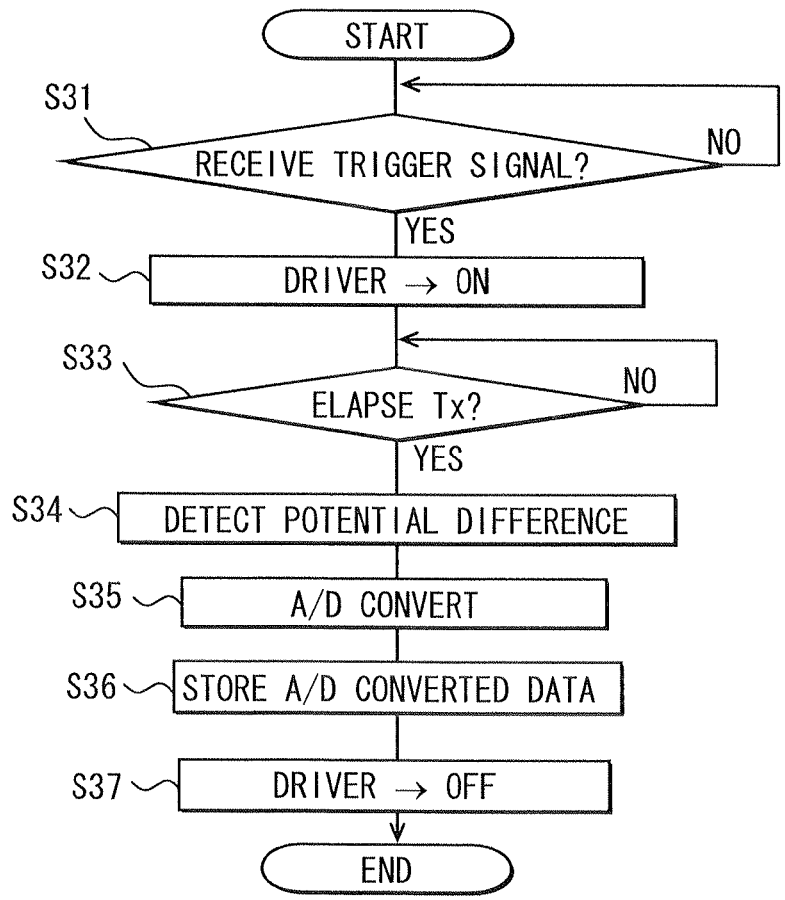
FIG. 9B is a flowchart showing a voltage detecting process performed by slaves.

Each of the slaves 32a-32d executes a voltage detecting process as shown in FIG. 9B while the master 31 executes the slave voltage receiving process shown in FIG. 9A. When each of the control circuits 34a-34d in the slaves 32a-32d receives the trigger signal transmitted from the master 1, which corresponds to "YES" at S31, each of the control circuits 34a-34d turns on the corresponding one of the drivers 9a-9d at S32 so that electric current flows to the communication buses 3H and 3L. When a predetermined time Tx elapses after each of the drivers 9a-9d is turned on, which corresponds to "YES" at S33, each of the A/D converter circuits 35a-35d detects the potential difference between the upstream terminal and the downstream terminal of the corresponding one of the shunt resistors 11a-11d at S34, and each of the A/D converter circuits 35a-35d converts analog data of the potential difference into digital data at S35. The converted digital data is referred to as potential difference data. Each of the control circuits 34a-34d stores the potential difference data in a memory at S36. The potential difference data is, for example, 8 bits. Then, each of the control circuits 34a-34d turns off the corresponding one of the drivers 9a-9d at S37 and the voltage detecting process ends.

Figure 9C:
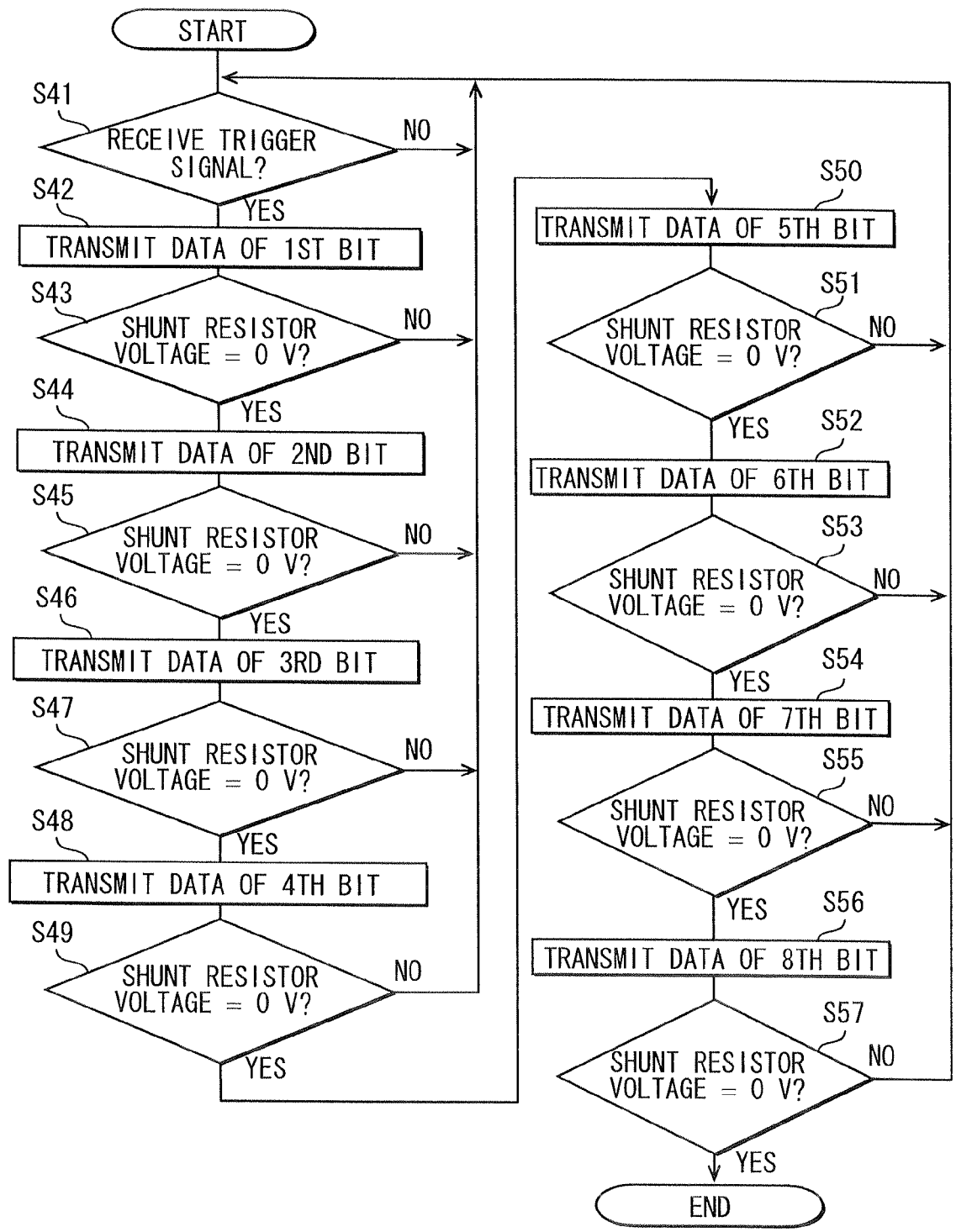
FIG. 9C is a flowchart showing a voltage transmitting process performed by the slaves.

Each of the slaves 32a-32s executes a data transmitting process as shown in FIG. 9C after executing the voltage detecting process shown in FIG. 9B. When each of the control circuits 34a-34d receives the trigger signal transmitted from the master 1 next to S21, which corresponds to "YES" at S42, each of the control circuits 34a-34d transmits ID setting data that is determined based on the potential difference data from the first bit, for example, by most significant byte (MSB) first, in synchronization with the falling edge of the signal at S42. For example, the ID setting data is an inverted value of the potential difference data.

Even after transmitting the first bit, each of the control circuits 34a-34d detects the potential difference between the upstream terminal and the downstream terminal of the corresponding one of the shunt resistors 11a-11d, that is, a shunt resistor voltage, and determines whether the shunt resistor voltage is 0 V at S43. When one of the control circuits 34a-34d determines that the shunt resistor voltage is 0 V, which corresponds to "YES" at S43, it means that there is no slave downstream the one of the control circuits 34a-34d. When one of the control circuits 34a-34d determines that the shunt resistor voltage is not 0 V, which corresponds to "NO" at S43, it means that there is a slave downstream the one of the control circuits 34a-34d. In this case, the process returns to S41, and the one of the control circuits 34a-34d transfers a transmission right to the downstream slave. In a case where a voltage is not exactly 0 V when the slaves 32a-32d do not drive the communication buses 3H and 3L due to influence of the downstream slave, a threshold value of less than 1 V may be set, and the determination result may be "NO" when the shunt voltage is less than the threshold value. From S44 to S57, one of the slaves 32a-32d transmits the data bit by bit from the second bit to the eight bit while confirming that the shunt resistor voltage is 0 V. When the one of the slaves 32a-32d determines that the shunt resistor voltage is 0 V at S57, the voltage transmitting process ends.

Figure 10:
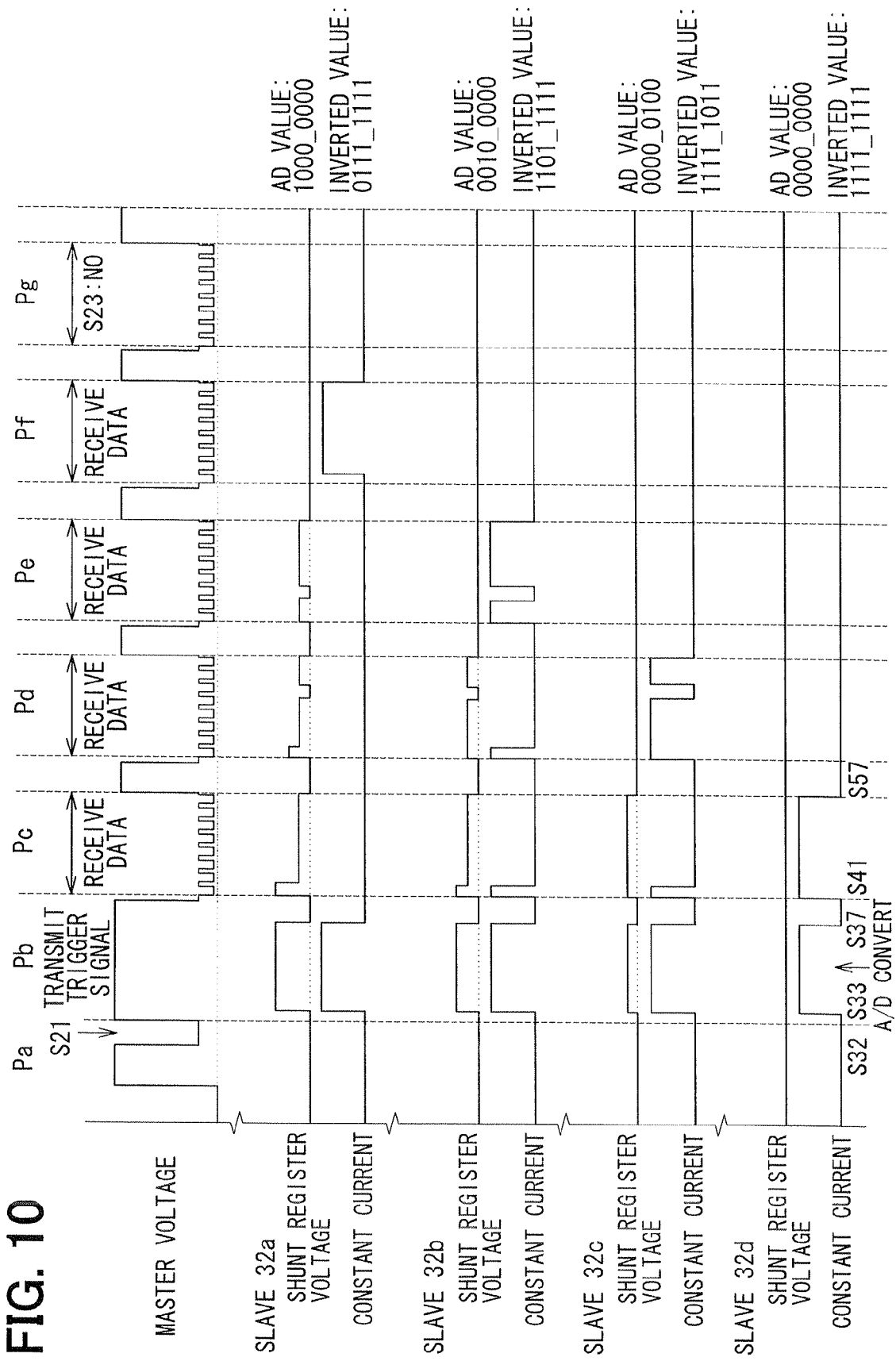
FIG. 10 is a timing diagram showing examples of signal change in the master and the slaves while the process shown in FIG. 9A to FIG. 9C are performed.

While the processes shown in FIG. 9A-9C are performed, signals in the master 31 and the slaves 32a-32d change, for example, as shown in FIG. 10. In a period Pa, the master 1 transmits the trigger signal at S21. In a period Pb, the slaves 32a-32d simultaneously turn on the drivers 9a-9d at S32. At the time, the shunt resistor voltage at the slave 32d is 0 V. The amount of electric current that flows to the shunt resistors 11a-11d increases toward the upstream side, that is, in order of the slave 32c, the slave 32b, and the slave 32a. Thus, the shunt resistor voltages increase in order of the slave 32c, the slave 32b, and the slave 32a.

At the beginning of a period Pc, which is a communication phase, all the slaves 32a-32d transmits the data of the first bit. Because it is only the slave 32d whose shunt resistor voltage is 0 V, the slave 32d continues to transmit the ID setting data of from the second bit to the eight bit. Even when the master 1 transmits the trigger signal after the slave 32d finishes transmitting the data, the slave 32d does not restart transmitting the ID setting data.

After a power supply phase by the master 1 ends, each of the slaves 32a-32c transmits the ID setting data of the first bit at the beginning of a period Pd in response to the trigger signal. Because it is only the slave 32c whose shunt resistor voltage is 0 V, the slave 32c continues to transmit the ID setting data of from the second bit to the eight bit. In a similar manner, the slave 32b transmits the ID setting data in a period Pe, and the slave 32a transmits the ID setting data in a period Pf. In a period Pg, no slave transmits data. Thus, the master 1 does not receive data from the slaves 32a-32d, which corresponds to "NO" at S23, and the slave voltage receiving process ends as shown in FIG. 9A. The A/D converted data (AD data) of the potential difference, that is, the potential difference data of the slaves 32a-32d and the inverted values of the potential difference data are shown in FIG. 10.

In the above-described processes, the A/D converted data of the shunt resistor voltage detected at the slaves 32d-32a during the period Pb, that is, the potential difference data of the slaves 32a-32d is, for example, 00000000B, 00000100B, 0010000B and 10000000B, respectively. In the ID setting data transmitted from the slaves 32a-32d through the communication buses 3H and 3L, a data value of 1 is transmitted in a driving state (dominant) and a data value of 0 is transmitted in a non-driving sate (recessive). As described above, each of the slaves 32a-32d determines whether a slave located downstream thereof starts to transmit the ID setting data base on whether the shunt resistor voltage is 0 V (non-driving state) when each of the slaves 32a-32d transmit the ID setting data of the first bit.

Thus, if a data value of MSB transmitted from a downstream slave is 0, an upstream slave may not recognize the start of transmitting data by the downstream slave, and a collision may occur. Thus, the downstream slave that detects lower shunt resistor voltage in the period Pb transmits the inverted value of the A/D converted data so that the MSB of the transmitted data becomes 1, and the transfer of the transmission right can be smoothly performed among the slaves 32a-32d. After the ID value is set to each of the slaves 32a-32d, the master 1 communicates with designating the ID value of a target slave. Thus, the above-described transfer is not required.

Figure 11A:
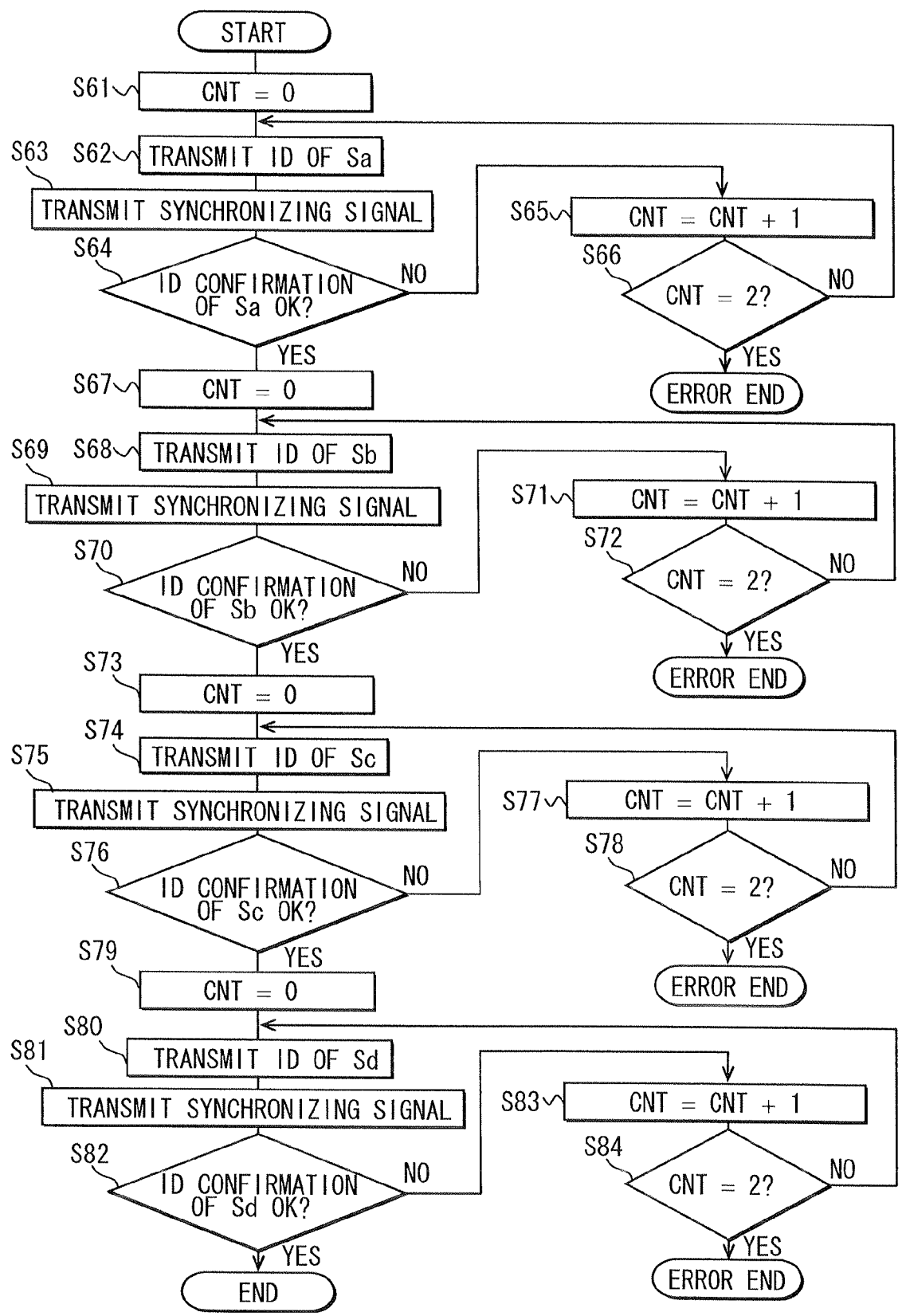
FIG. 11A is a flowchart showing an ID transmitting process performed by the master and FIG. 11B is a flowchart showing an ID setting process performed by the slaves.
Figure 11B:
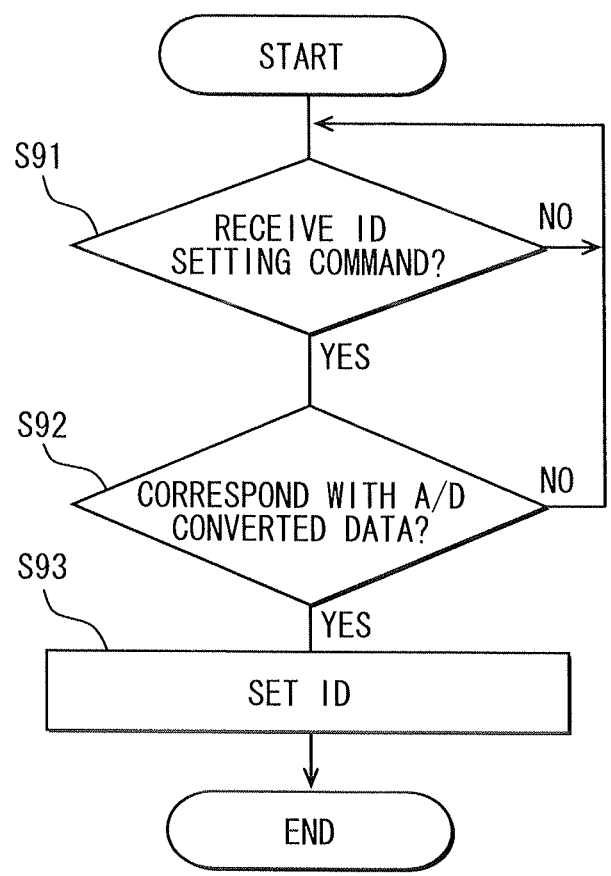

After master 1 executes the slave voltage detecting process shown in FIG. 9A, the master 1 executes an ID transmitting process shown in FIG. 11A, and each of the slaves 32a-32d executes an ID setting process shown in FIG. 11B. At S61, the master 1 sets a count CNT for counting a transmitting time to 0. At S62, the master 1 transmits ID data of the slave 32a (Sa) with an ID setting command. The ID data of Sa is an inverted value of the ID setting data transmitted from the slave 32a to the master 1, that is, a value same as the A/D converted data of the shunt resistor voltage, that is, the potential difference data between the upstream terminal and the downstream terminal of the shunt resistor 11a.

At S63, the master 1 transmits the synchronizing signal for receiving data in a manner similar to S22. At S64, the master 1 confirms a reply signal from the slave 32a. The reply signal indicates that the ID value is set to the slave 32a. When the master 1 receives the reply signal, which corresponds to "YES" at S64, the process proceeds to S67. When the master 1 does not receive the reply signal, which corresponds to "NO" at S64, the master 1 increases the count CNT by 1 at S65 and determines whether the count CNT is 2 at 66. When the count CNT is less than 2, which corresponds to "NO" at S66, the process returns to S62, and the master 1 transmits the ID data again. When the count CNT is 2, which corresponds to "YES" at S65, the ID transmitting process ends as an error end. At S67 to S74, the master 1 performs the similar process to the slave 32b (Sb). At S73 to S78, the master 1 performs the similar process to the slave 32c (Sc). At S79 to S84, the master 1 performs the similar process to the slave 32d (Sd).

In the ID setting process shown in FIG. 11B, when each of the slaves 32a-32d receives the ID setting command transmitted from the master 31, which corresponds to "YES" at S91, each of the slaves 32a-32d receives the ID data transmitted following the ID setting command. At S92, each of the slaves 32a-32d determines whether the ID data corresponds to the A/D converted data, that is, the potential difference data stored at S36. When each of the slaves 32a-32d determines that the ID data corresponds to the A/D converted data, which corresponds to "YES" at S92, each of the slaves 32a-32d sets the ID data as an ID value. When each of the slaves 32a-32d determines that the ID data does not correspond to the A/D converted data, which corresponds to "NO" at S92, the process returns to S91. Each of the slaves 32a-32d sets the ID value through the above-described process. After that, the master 31 transmits the ID data and a command designating a target slave, and only the slave corresponding to the ID data responds to the master 31.

In the communication network system according to the fifth embodiment, each of the control circuits 34a-34d in the slaves 32a-32d receives the trigger signal from the master 31, each of the slaves 32a-32d turns on the corresponding one of the drivers 9a-9d so that electric current flows in the communication buses 3H and 3L. While electric current flows to the communication buses 3H and 3L, and each of the control circuits 34a-34d receives the potential difference data, that is, the A/D converted data of the shunt resistor voltage from the corresponding one of the A/D converter circuits 35a-35d. Then, each of the control circuits 34a-34d turns off the corresponding one of the drivers 9a-9d. When each of the control circuits 34a-34d receives the trigger signal from the master 31 next time, each of the control circuits transmits the ID setting data that is determined based on the potential difference data to the master 31 while avoiding a collision with the transmitting process by other slave.

When the master 31 receives the ID setting data from all the slaves 32a-32d, the master 31 decides the ID data to be set to each of the slaves 32a-32d based on the ID setting data. Then, the master 31 transmits the ID data with the ID setting command to the slaves 32a-32d in order. When each of the control circuits 34a-34d in the slaves 32a-32d determines that the ID data transmitted with the ID setting command corresponds to the potential difference data, each of the control circuits 34a-34 sets the ID data as the ID value. Because the master 31 sets the ID of each of the slaves 32a-32d after figuring out the IDs of all the slaves 32a-32d, a discrepancy in the setting IDs between the master 31 and the slaves 32a-32d can be restricted. Furthermore, because each of the control circuits 34a-34d in the slaves 32a-32d uses the inverted value of the A/D converted data as the ID setting data transmitted to the master 31, in a protocol where an off-state of each of the drivers 9a-9d is set to data value of 0, a generation of a collision can be restricted, and a communication efficiency can be improved.

Other Embodiments

Although the present invention has been fully described in connection with the preferred embodiments thereof with reference to the accompanying drawings, it is to be noted that various changes and modifications will become apparent to those skilled in the art.

For example the ID values of the slaves may also be set in descending order in accordance with decrease in the detected bus voltage. In the present case, an ID value that is set first may be a value greater than the maximum connection value of slaves determined in a specification. The ID values do not always need to be set in ascending order or descending order. The ID values may be set so that at least each of the slaves can be identified. The resistance values of the shunt resistors 11a-11d and the load resistors 24a-24d may be change appropriately. The potential difference detecting portion may include a comparator.

When lower potential references (for example, the ground) of the slaves are not coupled through the communication bus 3L and the lower potential references are separately coupled with a potential reference point, shunt resistors do not need to be inserted into the lower potential side. Each of the drivers 9a-9d is not limited to a current driving type and may also be a voltage driving type. A correspondence between the driving state and the non-driving state of the communication buses 3M and 3L and the data values of 1 and 0 may be inverted. An application of the communication network system according to the above-described embodiments is not limited to a communication protocol such as DSI. The communication network system according to the above-described embodiments may be applied to any communication network system that includes a master and a plurality of slaves coupled through a pair of buses in a daisy-chain manner and dynamically sets an ID value of each of the slaves.

What is claimed is:

1. A communication network system comprising a master, a plurality of slaves, and a high-potential side bus and a low-potential side bus coupling the master and the plurality of slaves in a daisy-chain manner, wherein
each of the plurality of slaves includes:
a control circuit configured to control communication with the master;
a resistance element inserted into the high-potential side bus at a portion located downstream of a point where the control circuit is coupled with the high-potential side bus;
a potential difference detecting portion configured to detect a potential difference between an upstream terminal and a downstream terminal of the resistance element and to output potential difference data based on the detected potential difference; and
a driver coupled between the upstream terminal of the resistance element and the low-potential side bus, the driver configured to transmit a signal to the master by changing a state of electric current flowing to the high-potential side bus and the low-potential side bus,
when the control circuit receives a trigger signal from the master, the control circuit turns on the driver so that electric current flows to the high-potential side bus and the low-potential side bus, the control circuit receives the potential difference data output from the potential difference detecting portion while the electric current flows, and then the control circuit turns off the driver,
when the control circuit receives a trigger signal from the master next time, the control circuit transmits an ID setting data that is determined based on the potential difference data to the master while avoiding a collision with a transmitting process by other slave in the plurality of slaves,
when the master receives the ID setting data from all the plurality of slaves, the master decides ID data of each of the plurality of slaves based on the ID setting data, and the master transmits the ID data with an ID setting command to each of the plurality of slaves in order,
when the ID data transmitted from the master corresponds to the potential difference data, the control circuit sets the ID data as an ID value, and
the control circuit uses an inverted value of the potential difference data as the ID setting data transmitted to the master.

2. The communication network system, according to claim 1 wherein
the potential difference data outputted by the potential difference detecting portion is 8-bit data.

* * * * *